April 1, 1924. Re. 15,804

D. C. GILLEN

AUTOMOBILE TRAFFIC SIGNAL

Original Filed April 30, 1918

INVENTOR
D.C. GILLEN.

BY Chas. E. Townsend

ATTORNEY

Reissued Apr. 1, 1924. Re. 15,804

UNITED STATES PATENT OFFICE.

DANIEL C. GILLEN, OF SAN FRANCISCO, CALIFORNIA.

AUTOMOBILE TRAFFIC SIGNAL.

Original No. 1,319,276, dated October 21, 1919, Serial No. 231,703, filed April 30, 1918. Application for reissue filed January 3, 1921. Serial No. 434,836.

*To all whom it may concern:*

Be it known that I, DANIEL C. GILLEN, a citizen of the United States, and a resident of the city and county of San Francisco and State of California, have invented a certain new and useful Automobile Traffic Signal, of which the following is a specification.

The invention relates to a traffic signal adapted to be carried by an automobile.

The object of my invention is to indicate the right of way across street intersections to operators of other vehicles approaching at right angles to the first vehicle.

This object I accomplish by providing an attachment for a motor vehicle or the like comprising a stationary signal positioned upon the front of the vehicle in a vertical longitudinal plane, one side of said signal displaying a red color and the opposite side displaying a green color.

Many accidents are caused at street intersections due to the lack of familiarity of drivers with traffic regulations. The regulations require that any vehicle approaching an intersection has the right of way over all other vehicles approaching the same intersection from the left but must give way to all other vehicles approaching said intersection from the right. In other words, if the driver of an automobile approaching a street intersection observes another automobile approaching the intersection from the left on the cross street, the driver of the first automobile has the right of way, whereas if the vehicle on the cross street was approaching the same from the right of the first automobile then the conditions are reversed and the second automobile has the right of way.

One form which my invention may assume is exemplified in the following description and illustrated in the accompanying drawings in which:—

Figure 1:
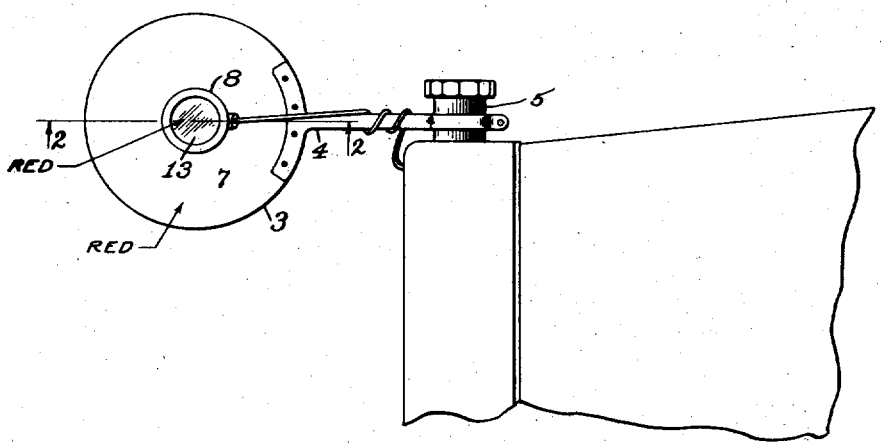
Fig. 1 is a side elevation of the device secured to the filling neck of the radiator of an automobile.
Figure 2:
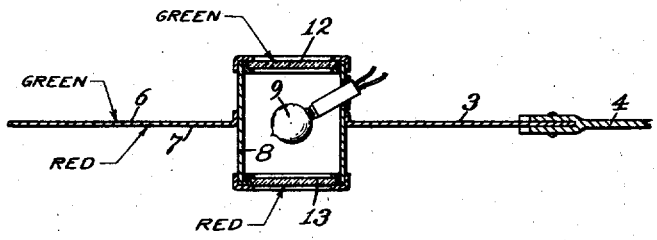
Fig. 2 is a cross section taken on the line 2—2 Fig. 1.

The device of my invention consists of a disk 3 or other suitably shaped object, which is provided with means for supporting it upon the automobile, preferably in a conspicuous position in front of the automobile. In the present instance the supporting means consists of a bracket 4 provided with a clamp adapted to engage the radiator neck 5. The disk is supported on the automobile, so that it lies in a vertical plane extending in the direction of the longitudinal axis of the automobile, so that when the automobile is observed from the right, the face 6 of the disk is seen and when observed from the left, the face 7 of the disk is seen. The face 6 of the disk is painted a color such as green, which is universally recognized as indicating a clear track and "go ahead", and the face 7 of the disk is painted red, a color which is universally recognized as indicating danger and "stop".

Arranged in the disk, preferably at the center, is a cylindrical housing 8, disposed perpendicularly to the disk, and within the housing is an electric lamp 9 which is preferably connected in circuit with the head lights of the automobile. The end of the housing which projects from the disk on the right side is closed with a green lens 12 to correspond to the color of the face 6 of the disk and the other end of the housing is closed with a red lens 13 to correspond to the color of the face 7 of the disk.

The device serves therefore, either by day or by night to signal the approaching car at an interesection either to proceed or to stop, depending upon the direction of approach of the car and by providing all automobiles with such devices, the danger of accidents at street intersections would be vastly minimized.

I claim:

1. A traffic signal comprising a flat plate, the opposite faces of the plate being of different colors, a housing arranged within the periphery of the plate, a lamp in said housing, lenses in the ends of said housing corresponding in color to the adjacent faces of the plate, and a bracket secured to said plate, and adapted to be secured to the neck of the automobile radiator to fixedly hold the plate in front of the radiator in a vertical plane passing longitudinally through the automobile.

2. A right of way signal comprising a plate, the opposite faces of which are differently colored, a housing carried by said plate, a lamp in said housing, lenses for the opposite sides of said housing corresponding in color to the adjacent faces of the plate and means for securing said plate and housing to the neck of an automobile radiator and retaining the same in a vertical longitudinal plane.

3. A right of way indicating signal for automobiles comprising a member having a pair of substantially parallel disposed display surfaces, a lens supported and disposed in parallelism with each surface, said surfaces being of different color and the lenses having the same color as the adjacent faces, means for illuminating said lenses during night travel, and a bracket for fixedly supporting the signal on the radiator of an automobile and in a position where the opposed display surfaces are parallel with the longitudinal axis of the automobile.

4. A traffic signal comprising a plate like member, the opposite faces of said member being of different colors, a lamp arranged substantially central of said member, a lens on each side of the lamp in parallelism with the faces and each lens corresponding in color to the adjacent faces of the member, and a bracket adapted to secure said member to an automobile radiator to fixedly hold the member on the radiator in a vertical plane passing longitudinally through the automobile.

5. A traffic signal comprising a plate like member, the opposite faces of the plate being of different colors, a housing arranged within the periphery of the plate, a lamp in said housing, a lens in each end of the housing corresponding in color to the adjacent faces of the plate, and a bracket adapted to secure the plate to the radiator of an automobile to fixedly hold the plate on the radiator in a vertical plane passing longitudinally through the automobile.

DANIEL C. GILLEN.